United States Patent
Li et al.

(10) Patent No.: US 11,537,879 B2
(45) Date of Patent: Dec. 27, 2022

(54) NEURAL NETWORK WEIGHT DISCRETIZING METHOD, SYSTEM, DEVICE, AND READABLE STORAGE MEDIUM

(71) Applicant: Tsinghua University, Beijing (CN)

(72) Inventors: Guoqi Li, Beijing (CN); Zhenzhi Wu, Beijing (CN); Jing Pei, Beijing (CN); Lei Deng, Beijing (CN)

(73) Assignee: Tsinghua University, Beijing (CN)

( * ) Notice: Subject to any disclaimer, the term of this patent is extended or adjusted under 35 U.S.C. 154(b) by 650 days.

(21) Appl. No.: 16/477,464

(22) PCT Filed: Dec. 5, 2017

(86) PCT No.: PCT/CN2017/114667
§ 371 (c)(1),
(2) Date: Jul. 11, 2019

(87) PCT Pub. No.: WO2019/006976
PCT Pub. Date: Jan. 10, 2019

(65) Prior Publication Data
US 2019/0362231 A1 Nov. 28, 2019

(30) Foreign Application Priority Data
Jul. 3, 2017 (CN) .......................... 201710530149.4

(51) Int. Cl.
*G06N 3/08* (2006.01)
*G06N 7/00* (2006.01)

(52) U.S. Cl.
CPC ............... *G06N 3/08* (2013.01); *G06N 7/005* (2013.01)

(58) Field of Classification Search
CPC ........... G06N 3/08; G06N 7/005; G06N 7/046
See application file for complete search history.

(56) References Cited

U.S. PATENT DOCUMENTS

| 7,814,038 | B1 | 10/2010 | Repici |
| 2014/0344203 | A1 | 11/2014 | Ahn |

(Continued)

FOREIGN PATENT DOCUMENTS

| CN | 102263636 A | 11/2011 |
| CN | 105095961 A | 11/2015 |

(Continued)

OTHER PUBLICATIONS

Li et al., "Training deep neural networks with discrete state transition", Jul. 4, 2017, Neurocomputing 272, pp. 154-162. (Year: 2017).*

(Continued)

*Primary Examiner* — Ying Yu Chen
(74) *Attorney, Agent, or Firm* — McCarter & English, LLP (57) ABSTRACT

There are provided a neural network weight discretizing method, system and device, and a computer readable storage medium. The method includes acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states. The method also includes acquiring a weight state of a previous time step and a weight increment of the current time step and acquiring a state transfer direction by using a directional function according to the weight increment of the current time step. The method also includes acquiring a weight state of the current time step according to the weight state of the previous time step, the weight increment of the current time step, the state transfer direction, the weight value range and the number of discrete weight states. The method ensures that the weight value is (Continued)

always constrained in the same discrete-state space without the need for storing an additional virtual continuous-state implicit weight. On the premise that the computation performance of the neural network is ensured, the consumption of storage space is greatly reduced, and the computation complexity is reduced.

7 Claims, 6 Drawing Sheets

(56) References Cited

U.S. PATENT DOCUMENTS

| | | | | |
|---|---|---|---|---|
| 2016/0026912 A1* | 1/2016 | Falcon | ............... | G06N 3/0454 706/25 |
| 2016/0328645 A1* | 11/2016 | Lin | ..................... | G06N 3/08 |
| 2016/0328646 A1* | 11/2016 | Lin | ................. | G06K 9/4628 |

FOREIGN PATENT DOCUMENTS

| | | |
|---|---|---|
| CN | 106056212 A | 10/2016 |
| CN | 106845632 A | 6/2017 |
| CN | 106875003 A | 6/2017 |
| CN | 106897768 A | 6/2017 |
| CN | 106909969 A | 6/2017 |
| WO | 2013/181410 A2 | 12/2013 |

OTHER PUBLICATIONS

Deng et al., "Gated XNOR Networks: Deep Neural Networks with Ternary Weights and Activations under a Unified Discretization Framework", May 25, 2017, arXiv:1705.09283v1, pp. 1-9. (Year: 2017).*

International Search Report for Application No. PCT/CN2017/114670, dated Mar. 6, 2018, 2 pages.

International Search Report for Application No. PCT/CN2017/114667, dated Apr. 3, 2018, 2 pages.

* cited by examiner

NEURAL NETWORK WEIGHT DISCRETIZING METHOD, SYSTEM, DEVICE, AND READABLE STORAGE MEDIUM

RELATED APPLICATION

The present application is a 35 U.S.C. § 371 national stage filing of International Application No. PCT/CN2017/114667, filed Dec. 5, 2017, which claims the benefit of priority of Chinese patent application No. 201710530149.4 filed on Jul. 3, 2017 and titled "NEURAL NETWORK WEIGHT DISCRETIZING METHOD AND SYSTEM," the contents of each of the above named applications being incorporated herein in its entirety by reference.

TECHNICAL FIELD

The disclosure relates to the field of neural network technologies, and in particular, to a neural network weight discretizing method, system, device, and readable storage medium.

BACKGROUND

In the past few years, big data sets, different learning models, and GPUs (General Purpose Graphic Processing Units) have enabled deep neural networks to get more and more achievements in the field of artificial intelligence such as computer vision, speech recognition, natural language processing, and human-machine Go games. However, behind these compelling results, the enormous hardware resource overhead, training time overhead, and power consumption required for their calculation are also paid. Therefore, it is difficult for GPU-based deep learning systems to be embedded in portable devices. Many solutions with higher power consumption often have a large loss in performance. Therefore, there is a trade-off between performance and computation complexity.

Traditional solutions, including pruning and pre-training on neural networks, can be used to reduce the number of parameters, thereby reducing the computation complexity in the inferential phase. The connections can also be simplified by designing a compact layer or a sparse connection. There are also other efforts, including quantifying parameters as well as substituting the weight and the real multiplication of the activation function by integer shifts, but all result in a certain degree of decline in the overall performance of the neural network.

Besides, the study of binary deep neural networks also makes a trade-off between the performance and the overhead of the neural networks. For example, when performing forward and backward calculations, floating-point multiplications and additions are simplified to simple logical operations such as XNOR logic and bit counts by constraining weights (and activation functions) to binary values {−1, 1}. Near-optimal classification precisions have been achieved on many data sets. However, these techniques inevitably require the preservation of full precision weights for gradient descent methods, resulting in significant buffer overhead and floating point operations, as well as additional external access power consumption. In addition, many new portable devices are based on multi-value memory devices that support the storage of multiple state values, making binary algorithms unable to take full advantage of the device's capabilities. Therefore, an urgent problem to be solved in the field of neural network research is how to efficiently perform deep neural network training in multi-valued discrete weight space, thereby improving the information processing efficiency of the neural network and reducing the computation cost of neural network.

SUMMARY

On this basis, with regard to the problem of how to compromise between the performance and the computation complexity of neural network, it is necessary to provide a neural network weight discretizing method, system, device and computer readable storage medium herein. Said method comprises:

acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states;

acquiring a weight state of a previous time step and a weight increment of the current time step;

acquiring a state transfer direction by using a directional function according to the weight increment of the current time step;

acquiring a weight state of the current time step according to the weight state of the previous time step, the weight increment of the current time step, the state transfer direction, the weight value range and the number of discrete weight states.

In one embodiment, said acquiring a weight state of a previous time step and a weight increment of the current time step comprises:

randomly initializing the weight state;

determining the weight state of the previous time step from calculations according to the randomly initialized weight state and a forward output error; and acquiring the weight increment of the current time step by using a gradient descent algorithm according to the weight state of the previous time step.

In one embodiment, the method further comprises, after acquiring a state transfer direction by using a directional function according to the weight increment of the current time step:

calculating a integer step length of the weight increment of the current time step by using a decomposition function according to the weight increment of the current time step, the weight value range, and the number of discrete weight states;

determining a state transfer distance according to the integer step length;

said acquiring a weight state of the current time step according to the weight state of the previous time step, the weight increment of the current time step, the state transfer direction, the weight value range and the number of discrete weight states further comprises:

acquiring the weight state of the current time step according to the weight state of the previous time step, the weight increment of the current time step, the state transfer direction, the state transfer distance, the weight value range, and the number of discrete weight states.

In one embodiment, the method further comprises, after calculating a integer step length of the weight increment of the current time step by using a decomposition function:

calculating a remainder of the weight increment of the current time step by using a decomposition function according to the weight increment of the current time step, the weight value range and the number of discrete weight states;

determining a state transfer probability according to the remainder, the weight value range and the number of discrete weight states;

Said acquiring the weight state of the current time step according to the weight state of the previous time step, the weight increment of the current time step, the state transfer direction, the state transfer distance, the weight value range, and the number of discrete weight state further comprises:

acquiring the weight state of the current time step according to the weight state of the previous time step, the weight increment of the current time step, the state transfer direction, the state transfer distance, the state transfer probability, the weight value range, and the number of discrete weight states.

In one embodiment, said determining a state transfer probability according to the remainder, the weight value range and the number of discrete weight states comprises:

acquiring a transfer probability operator (i.e., transition probability operator) according to the remainder of the weight increment of the current time step and a discrete adjacent state distance value which is determined according to the weighting value range and the number of discrete weight states;

acquiring a state transfer probability function according to the transfer probability operator and the remainder;

acquiring a state transfer probability according to the state transfer probability function and a binary sampling method.

According to the neural network weight discretizing method provided by the present disclosure, with a given discrete weight space, on the basis of the acquired weight state of the previous time step and the weight increment of the current time step, the range of weight values of the current time step in a virtual continuous state space is calculated, a state transfer direction is acquired, and finally the weight state of the current time step is acquired according to the weight state of the previous time step, the weight increment of the current time step and the state transfer direction. The calculating method for the weight discretization provided by the disclosure can realizing a direct transfer of the state in a discrete state space within a given weight discrete range according to the given number of discrete weight states by calculating the transfer direction of the discrete weights, making sure that the weight value is always constrained in the same discrete-state space without the need for storing an additional virtual continuous-state implicit weight with full precision. On the premise that the computation performance of the neural network is ensured, the consumption of a storage space is greatly reduced, and the computation complexity is reduced.

In one embodiment, by randomly initializing the weight state, after a range for weight discretization is given, the weight state of the previous time step and the weight increment of the current time step are obtained with a given forward output error and a gradient descent algorithm, to ensure the precision of the weight state after discretization.

In one embodiment, after acquiring the state transfer direction, the integer step length of the weight increment of the current time step is further calculated by the decomposition function, and the state transfer distance is determined according to the integer step length; finally the weight state of the current time step is acquired according to the weight state of the previous time step, the weight increment of the current time step, the state transfer direction, the state transfer distance, the weight value range, and the number of the discrete weight states. In given weight discrete range, a direct transfer of the state of the discrete-state space, with a larger range than the case where only the transfer direction is taken into consideration, can be achieved by calculating the transfer direction and transfer distance of the discrete weights according to the given number of discrete weight states within a given weight discrete range, making sure that the weight value is always constrained in the same discrete-state space, without the need for storing an additional virtual continuous-state implicit weight with full precision. On the premise that the computation performance of the neural network is ensured, the consumption of a storage space is greatly reduced, and the computation complexity is reduced.

In one embodiment, the remainder of the weight increment of the current time step is calculated by resolving a function for weight increment of the current time step; and the state transfer probability value is obtained according to the remainder of the weight increment of the current time step. A state transfer direction, a state transfer distance, and a state transfer probability value of the discrete weight value are determined according to the obtained state transfer direction, state transfer distance, and state transfer probability value, respectively, so that the calculated discrete weights are not only closely related to the continuous state weight values prior to discretization, but also can meet the requirements on full-time discretization by direct transfer of discrete states, thereby ensuring the computation precision of the neural network, greatly reducing the storage of virtual continuous-state implicit weight, and reducing the computation complexity.

In one embodiment, a state transfer probability vector is calculated according to the state transfer probability function and the remainder of the weight increment of the current time step; by the state transfer probability vector and a binary sampling method, the obtained state transfer probability is closely related to the remainder of the weight increment of the current time step prior to discretization, so that the weight state distribution after discretization by the neural network is more precisely approximated to the original continuous state weight value in term of probability, thereby completing the process of discretization while ensuring the computation precision of the neural network.

The disclosure further provides a neural network weight discretizing system, comprising:

a weight space establishing module for acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states;

a weight value and weight increment acquiring module for acquiring a weight state of a previous time step and a weight increment of the current time step;

a state transfer direction acquiring module for acquiring a state transfer direction by using a directional function according to the weight increment of the current time step;

a weight state of the current time step acquiring module for acquiring a weight state of the current time step according to the weight state of the previous time step, the weight increment of the current time step, the state transfer direction, the weight value range and the number of discrete weight states.

In one embodiment, the weight value and weight increment acquiring module comprises:

a weight initializing unit for randomly initializing the weight state;

a weight state of previous time step determining unit for determining the weight state of the previous time step from calculations according to the randomly initialized weight state and a forward output error;

a weight increment of current time step acquiring unit for acquiring a weight increment of the current time step by using a gradient descent algorithm according to the weight state of the previous time step.

In one embodiment, the system further comprises:

a decomposition function calculating module for calculating a integer step length of the weight increment of the current time step by using a decomposition function according to the weight increment of the current time step, the weight value range, and the number of discrete weight states;

a state transfer distance determining module for determining a state transfer distance according to the integer step length;

The weight state of current time step acquiring module is further used for:

acquiring the weight state of the current time step according to the weight state of the previous time step, the weight increment of the current time step, the state transfer direction, the state transfer distance, the weight value range, and the number of discrete weight states.

In one embodiment, the system further comprises:

The decomposition function calculating module is further used for calculating a remainder of the weight increment of the current time step by using a decomposition function according to the weight increment of the current time step, the weight value range and the number of discrete weight states.

a state transfer probability determining module for determining a state transfer probability according to the remainder, the weight value range and the number of discrete weight states;

The weight state of current time step acquiring module is further used for:

acquiring the weight state of the current time step according to the weight state of the previous time step, the weight increment of the current time step, the state transfer direction, the state transfer distance, the state transfer probability, the weight value range, and the number of discrete weight states.

In one embodiment, state transfer probability determining module comprises:

a transfer probability operator acquiring unit for acquiring a transfer probability operator according to the remainder of the weight increment of the current time step and a discrete adjacent state distance value which is determined according to the weighting value range and the number of discrete weight states;

a state transfer probability function acquiring unit for acquiring a state transfer probability function according to the transfer probability operator and the remainder;

a state transfer probability acquiring unit for acquiring a state transfer probability according to the state transfer probability function and a binary sampling method.

According to the neural network weight discretizing system provided by the present disclosure, with a given discrete weight space, on the basis of the acquired weight state of the previous time step and the weight increment of the current time step, the range weight values of the current time step in a virtual continuous state space is calculated, a state transfer direction is acquired, and finally the weight state of the current time step is acquired according to the weight state of the previous time step, the weight increment of the current time step and the state transfer direction. The calculating method for the weight discretization provided by the disclosure can realizing a direct transfer of the state in a discrete state space within a given weight discrete range according to the given number of discrete weight states by calculating the transfer direction of the discrete weights, making sure that the weight value is always constrained in the same discrete-state space without the need for storing an additional virtual continuous-state implicit weight with full precision. On the premise that the computation performance of the neural network is ensured, the consumption of a storage space is greatly reduced, and the computation complexity is reduced.

In one embodiment, by randomly initializing the weight state, after a range for weight discretization is given, the weight state of the previous time step and the weight increment of the current time step are obtained with a given forward output error and a gradient descent algorithm, to ensure the precision of the weight state after discretization.

In one embodiment, after acquiring the state transfer direction, the integer step length of the weight increment of the current time step is further calculated by the decomposition function, and the state transfer distance is determined according to the integer step length; finally the weight state of the current time step is acquired according to the weight state of the previous time step, the weight increment of the current time step, the state transfer direction, the state transfer distance, the weight value range, and the number of the discrete weight states. In given weight discrete range, a direct transfer of the state of the discrete-state space, with a larger range than the case where only the transfer direction is taken into consideration, can be achieved by calculating the transfer direction and transfer distance of the discrete weights according to the given number of discrete weight states within a given weight discrete range, making sure that the weight value is always constrained in the same discrete-state space, without the need for storing an additional virtual continuous-state implicit weight with full precision. On the premise that the computation performance of the neural network is ensured, the consumption of a storage space is greatly reduced, and the computation complexity is reduced.

In one embodiment, the remainder of the weight increment of the current time step is calculated by resolving a function for weight increment of the current time step; and the state transfer probability value is obtained according to the remainder of the weight increment of the current time step. A state transfer direction, a state transfer distance, and a state transfer probability value of the discrete weight value are determined according to the obtained state transfer direction, state transfer distance, and state transfer probability value, respectively, so that the calculated discrete weights are not only closely related to the continuous state weight values prior to discretization, but also can meet the requirements on full-time discretization by direct transfer of discrete states, thereby ensuring the computation precision of the neural network, greatly reducing the storage of virtual continuous-state implicit weight, and reducing the computation complexity.

In one embodiment, a state transfer probability vector is calculated according to the state transfer probability function and the remainder of the weight increment of the current time step; by the state transfer probability vector and a binary sampling method, the obtained state transfer probability is closely related to the remainder of the weight increment of the current time step prior to discretization, so that the weight state distribution after discretization by the neural network is more precisely approximated to the original continuous state weight value in term of probability, thereby completing the process of discretization while ensuring the computation precision of the neural network.

The disclosure further provides a computing system including a processor and a memory storing computer instructions thereon, wherein the computer instructions, when being executed by the processor, cause the processor to perform the steps of the respective methods of the above-described embodiments.

The disclosure further provides a computer readable storage medium containing computer instructions, wherein the computer instructions, when being executed by a processor, cause the processor to perform the steps of the respective methods of the above-described embodiments.

DETAILED DESCRIPTION

In order to make the object, technical solution and advantages of the present disclosure more apparent, the disclosure is further described in detail below in combination with the drawings and embodiments. It will be appreciated that the detailed embodiments are described here only for interpreting the disclosure rather than limiting the disclosure.

The main operating part of a neural network calculation is the multiply—accumulate operations of input data and weights. The precision of the weights directly affects the computation complexity. By a probability sampling method, the disclosure can effectively reduce the precision requirement of weights, significantly decreases the buffer usage of the weight memory and reduce the computation complexity with hardly any impact on performance. This method can be used for both offline learning neural network and on-chip online learning process, and has low hardware implementation complexity, and can be used for network structures such as multi-layer perceptron and deep convolutional neural network.

In the forward and backward computations of a deep neural network, all states are constrained in a discrete space, and a minimum cost function is taken as a training target. The disclosure provides a Discrete State Transition (DST) method that can achieve this target, that is, a method to optimize an objective function in an iterative manner is defined, so that the weight parameters are always constrained within a predetermined discrete space.

Figure 1:
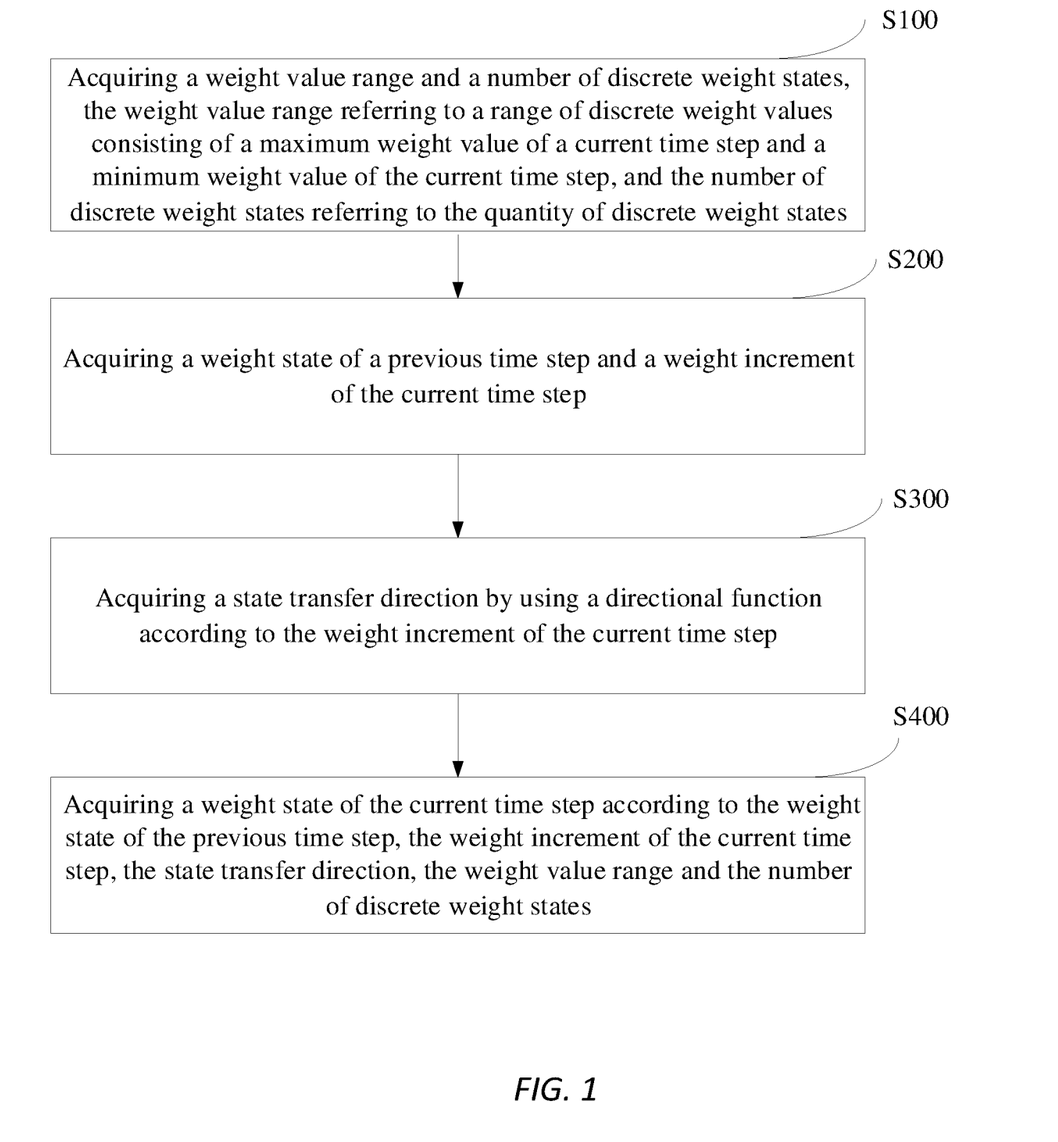
FIG. 1 is a schematic flowchart of a neural network weight discretization method in an embodiment.

FIG. 1 is a schematic flowchart of a neural network weight discretization method in an embodiment. The neural network weight discretization method shown by FIG. 1 comprises:

Step S100, acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states.

Figure 5:
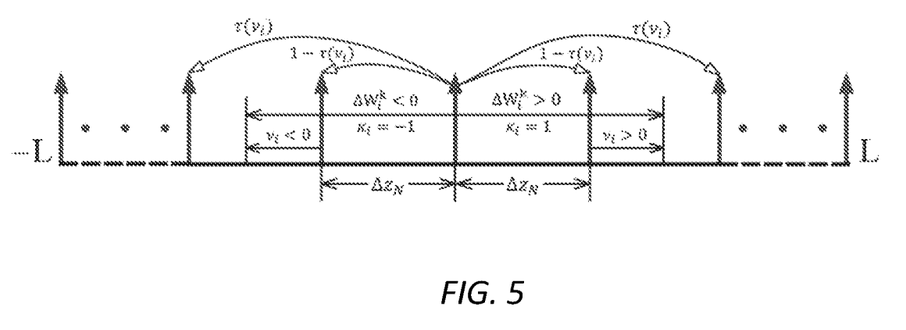
FIG. 5 is a diagram of the neural network weight discretization in an embodiment.

Specifically, the acquired weight value range [−L, L] is a range of the discretized weight values as demanded, and the acquired number of discrete weight states ($2^N+1$) is the quantity of discretized weight values as demanded. It can be understood that the acquired weight value range and the acquired number of discrete weight states may refer to the weight value range and the number of discrete weight states obtained from calculations according to a specific demand, or may be the weight value range and the number of discrete weight states directly set using manual input. As shown in FIG. 5, the range for the dispersed weight space (DWS) is [−L, L], and the number of the discrete weight states is ($2^N+1$).

In a deep neural network, assuming that the weight/state is trained in an interval [−L, L], the DWS $Z_N$, is defined as a combination of weights as:

$$Z_N = \left\{ z_N^n \mid z_N^n = \left( \frac{n}{2^{N-1}} - 1 \right) L, n = 0, 1, \ldots, 2^N \right\}.$$

Wherein, N is a given non-negative integer N∈$Z^+$, i.e. N=0, 1, 2, . . . . For a given N, the total number of states is $2^N+1$, and $$\Delta z_N = \frac{L}{2^{N-1}}$$

is the distance between adjacent states. To compare DWSs, defining a Continuity Weight Space (CWS) where the elements can be any value with full precision, and a Binary Weight Space (BWS) where the elements belong to {−1, 1}×L. In N→∞, DWS is CWS, and degenerates to BWS when N=0.

Step S200, acquiring a weight state of a previous time step and a weight increment of the current time step.

Specifically, when acquiring the weight information of a neural network, the weight information of the current time step is generally acquired by accumulating the acquired weight state of the previous time step and the weight increment of the current time step. The weight increment of the current time step may be calculated from the learning rule of error backward propagation based on a gradient descent algorithm. An initial weight of the previous time step is represented by $W_i^0$, and the weight increment of the current time step is represented by $\Delta W_i^k$.

Step S300, acquiring a state transfer direction by using a directional function according to the weight increment of the current time step.

Specifically, the directional function comprises a sign function $D^k = \text{sign}(\Delta W_i^k)$, where $\text{sign}(\Delta W_i^k)$ is a sign function. The weight increment of the current time step is positive or negative after a sign operation, and the state transfer direction is positive or negative correspondingly.

Step S400, acquiring a weight state of the current time step according to the weight state of the previous time step, the weight increment of the current time step, the state transfer direction, the weight value range and the number of discrete weight states.

Specifically, the weight state of the current time step is acquired within discretized weight states determined from the weight value range and the number of discrete weight states, according to the weight state of the previous time step, the weight increment of the current time step, and the determined state transfer direction.

If a weight value range is [−1, 1], and the determined state transfer direction is positive, then the weight state of the current time step may be 1.

If a weight value range is [−5, 5], the number of discrete weight states is 10, and the determined state transfer direction is positive, then the weight state of the current time step may be 1, 2, 3, 4 or 5 depending on the different weight increments of the current time step.

According to the neural network weight discretizing method provided by the present disclosure, with a given discrete weight space, on the basis of the acquired weight state of the previous time step and the weight increment of the current time step, the weight increment of the current time step in a virtual continuous state space is calculated, a state transfer direction is acquired, and finally the weight state of the current time step is acquired according to the weight state of the previous time step, the weight increment of the current time step and the state transfer direction. The calculating method for the weight discretization provided by the disclosure can realizing a direct transfer of the state in a discrete state space within a given weight discrete range according to the given number of discrete weight states by calculating the transfer direction of the discrete weights, making sure that the weight value is always constrained in the same discrete-state space without the need for storing an additional virtual continuous-state implicit weight with full precision. On the premise that the computation performance of the neural network is ensured, the consumption of a storage space is greatly reduced, and the computation complexity is reduced.

In one embodiment, said acquiring a weight state of a previous time step and a weight increment of the current time step comprises: randomly initializing the weight state; determining the weight state of the previous time step from calculations according to the randomly initialized weight state and a forward output error; and acquiring the weight increment of the current time step by using a gradient descent algorithm according to the weight state of the previous time step.

Specifically, the randomly initialized weight is represented by $W_i^0$, then a random initialization matrix is expressed as $W^0 = [W_1^0, W_2^0, \ldots, W_i^0, \ldots, W_N^0]$ wherein $W_i^0 \in Z_N$. The random initialization is a random number calculated from a preset random number calculation rule. When the k-th calculation is performed, a forward output error $\vec{e}$ is calculated for $W_i^k \in Z_N$. For a preset parameter ε (in a verification set or test set), if $\|\vec{e}\|_F < \varepsilon$ then the calculation is stopped; otherwise, continue with the k+1-th calculation, until the condition for stopping the calculation is met. The forward output error refers to an absolute value of the difference between the forward output of the neural network and an expected result.

To be specific, a probabilistic gradient projection operator is introduced here for converting a continuous weight increment to a discrete transfer increment. A vector of the weight increment of the current time step is set as $\Delta W^k = [\Delta W_1^k, \Delta W_2^k, \ldots, \Delta W_i^k, \ldots, \Delta W_N^k]$, wherein $\Delta W^k$ can be obtained in different ways. In a standard gradient descent method, $\Delta W^k = [-\eta \nabla E(W_1^k), -\eta \nabla E(W_2^k), \ldots, -\eta \nabla E(W_i^k), \ldots, -\eta \nabla E(W_N^k)]$ wherein $\nabla E(W^k)$ represents a gradient which is a derivative of a cost function of the weight, and the gradient descent algorithm is an algorithm used to make the output matches an ideal state more closely. η is the selected step length, which is the selected learning rate. $\Delta W^k$ may also be obtained by other backward propagation learning rules, W is a weight vector, with one element $W_i, i=1, 2, \ldots, N$ being a state of ZN. N is the dimension of the variable W.

In this embodiment, the weight increment of the current time step is calculated within a given range of forward output error from calculations according to the randomly initialized weight matrix, and the weight of the current time step is adjusted accordingly, thereby making the update process of the neural network can meet the needs of practical applications continuously.

Figure 2:
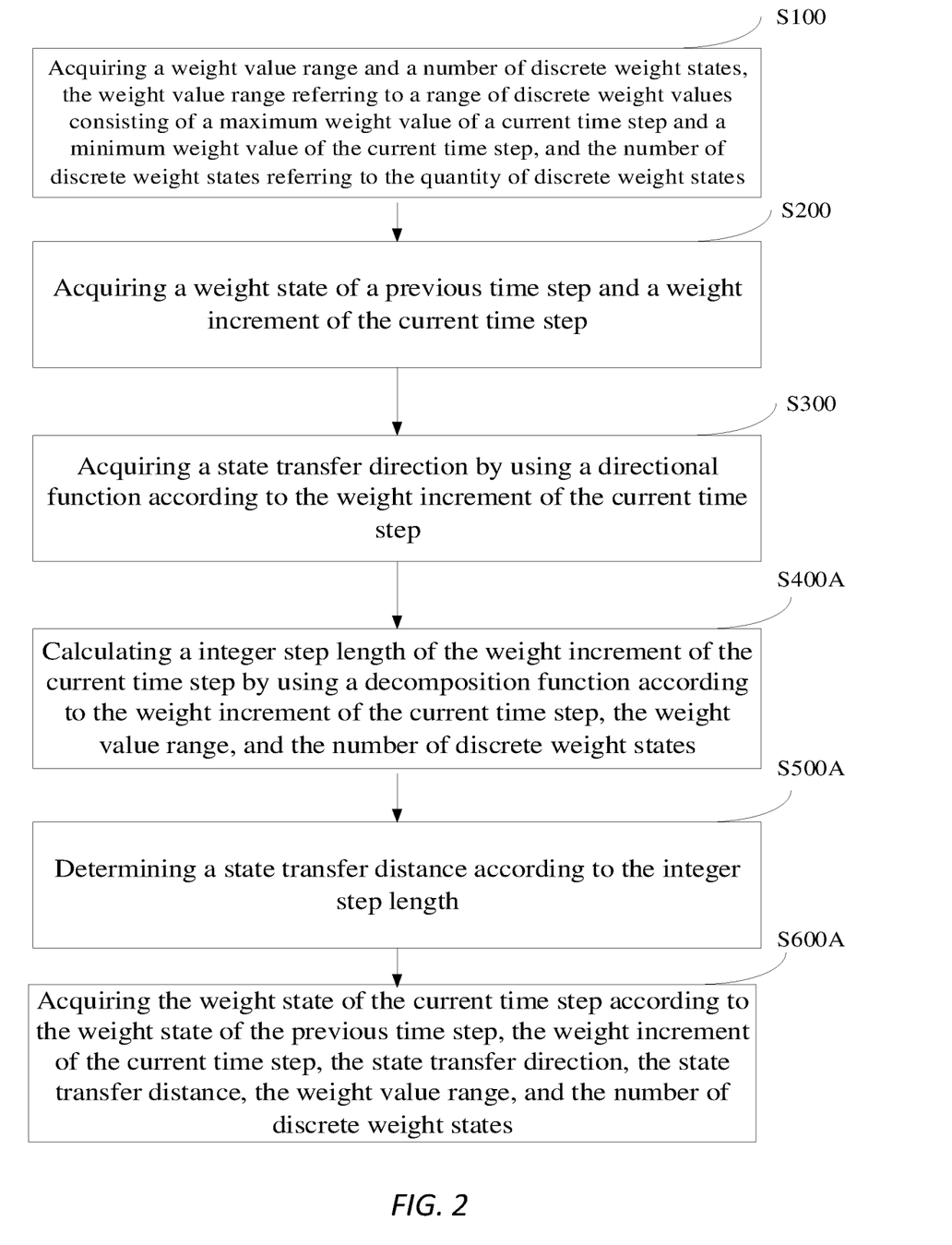
FIG. 2 is a schematic flowchart of a neural network weight discretization method in another embodiment.

FIG. 2 is a schematic flowchart of a neural network weight discretization method in another embodiment. The neural network weight discretization method shown in FIG. 2 comprises:

Step S100, acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states.

Specifically, the step S100 here is the same as the step S100 in FIG. 1.

Step S200, acquiring a weight state of a previous time step and a weight increment of the current time step.

Specifically, the step S200 here is the same as the step S200 in FIG. 1.

Step S300, acquiring a state transfer direction by using a directional function according to the weight increment of the current time step.

Specifically, the step S300 here is the same as the step S300 in FIG. 1.

Step S400A, calculating a integer step length of the weight increment of the current time step by using a decomposition function according to the weight increment of the current time step, the weight value range, and the number of discrete weight states.

Specifically, according to the weight state $W_i^k$ of the previous time step, the weight increment $\Delta W_i^k$ of the current time step and the weight value range [−L, L], a function of the weight increment of the current time step is acquired by $\Delta W_i^k = \kappa_i \Delta z_N + v_i$, wherein k is the weight increment integer of the current time step, v is a remainder of the weight increment of the current time step, and $i\Delta z_N$ is a distance value of discrete adjacent states, which is determined by the weight value range [−L, L] and the number of discrete weight states $(2^N+1)$.

In a given iterative training process of a deep neural network, it is assumed that $W_i^k = z_N^m \in Z_N$ (m=0, 1, ..., $2^N$) is a weight state of the k-th iteration step, wherein $W^k$ is treated as a vector and i represents the i-th element. The weight increment $\Delta Wi^k$ on $Wi^k$ is obtained from the gradient of the k-th iteration. First, a range constraint on $\Delta Wi^k$ is defined to prevent the weight from jumping out of the boundary of [−L, L]:

$$\Delta W_i^k = \begin{cases} \min(L - W_i^k, \Delta W_i^k), & \text{if } \Delta W_i^k \geq 0 \\ \min(-L - W_i^k, \Delta W_i^k), & \text{else} \end{cases}.$$

The integer step length of $\Delta W_i^k$ is resolved:

$$\Delta W_i^k = \kappa_i \Delta z_N + v_i$$

$$\kappa_1 = \text{fix}(\Delta W_i^k / \Delta z_N)$$

Wherein, fix(.) is a rounding function to 0.

Step S500A, determining a state transfer distance according to the integer step length.

Specifically, the state transfer distance may be set as needed according to the acquired different weight value ranges [−L, L] and the acquired different number of discrete weight states ($2^N+1$).

For instance, the discretized state transfer distance is determined according to the integer step length. If the integer step length is 2, then it is determined that the discretized state transfer distance is 2 within the value range, or it is determined that the state transfer distance is 2 states.

The correspondence between the integer step length and the state transfer distance may also be set according to the difference weight value ranges and different numbers of the discrete weight states. For example, the correspondence between the integer step length within a certain range and the state transfer distance is a proportional relationship, but the integer step length exceeding that certain range only corresponds to the largest state transfer distance within the weight range. This can be set according to various actual needs.

Step S600A, acquiring the weight state of the current time step according to the weight state of the previous time step, the weight increment of the current time step, the state transfer direction, the state transfer distance, the weight value range, and the number of discrete weight states.

Specifically, a final weight state of the current time step is acquired according to the weight state of the previous time step, the weight increment of the current time step, the state transfer direction, the state transfer distance, a established weight value range and the number of discrete weight states.

For example, the weight value range is (−5, 5), the number of discretized states is 10, the determined state transfer direction is positive, and the determined state transfer distance is 2, then the weight state of the current time step is the weight state of the previous time step plus two steps.

In this embodiment, after acquiring the state transfer direction, the integer step length of the weight increment of the current time step is further calculated by the decomposition function; the state transfer distance is determined according to the integer step length; and finally the weight state of the current time step is acquired according to the weight state of the previous time step, the weight increment of the current time step, the state transfer direction, the state transfer distance, the weight value range, and the number of the discrete weight states. In a given weight discrete range, a direct transfer of the state in a discrete state space, with a larger range than the case where only the transfer direction is taken into consideration, can be realized according to the given number of discrete weight states by calculating the transfer direction and the transfer distance of the discrete weights, making sure that the weight value is always constrained in the same discrete-state space, without the need for storing an additional virtual continuous-state implicit weight with full precision. On the premise that the computation performance of the neural network is ensured, the consumption of a storage space is greatly reduced, and the computation complexity is reduced.

Figure 3:
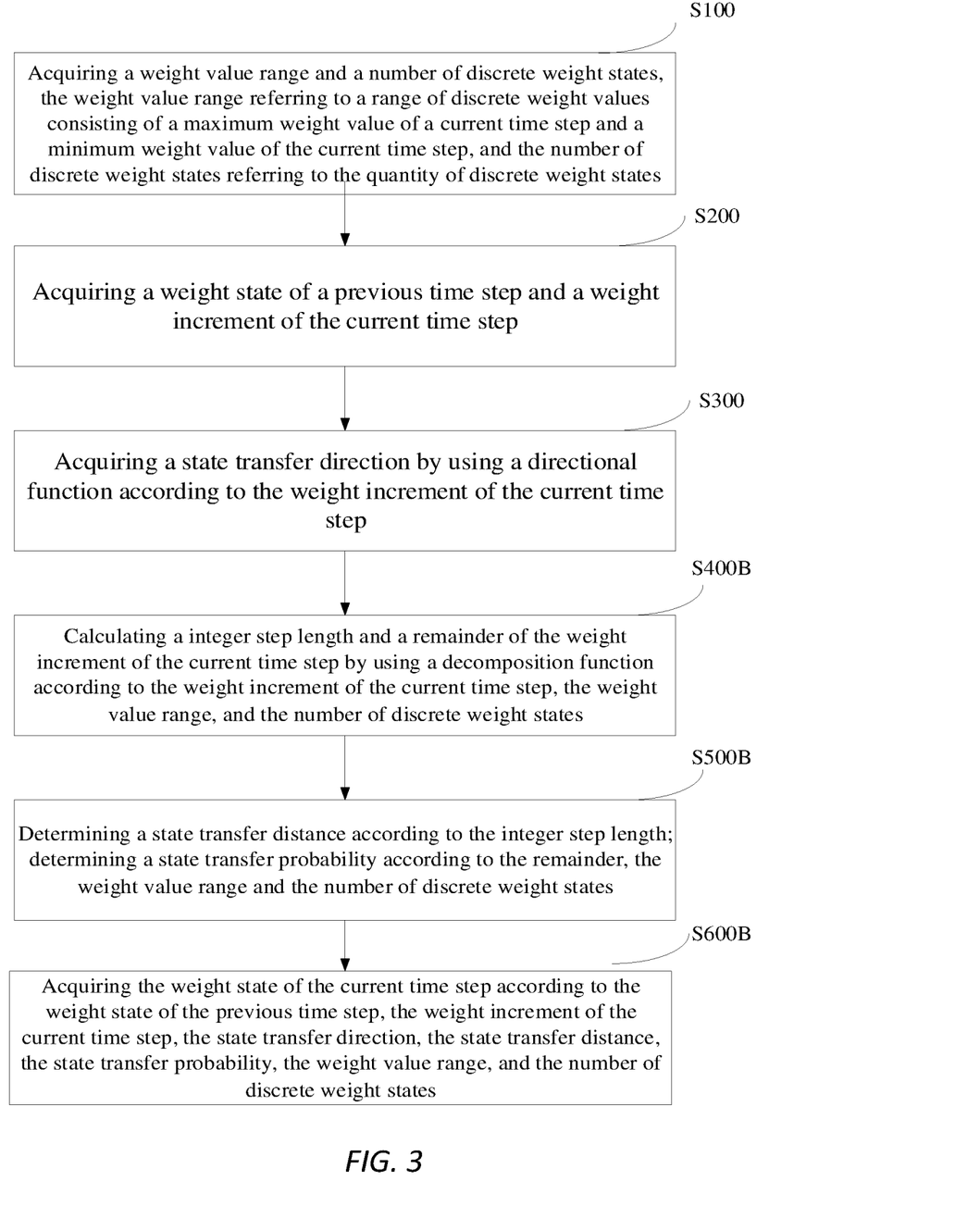
FIG. 3 is a schematic flowchart of a neural network weight discretization method in a further embodiment.

FIG. 3 is a schematic flowchart of a neural network weight discretization method in a further embodiment. The neural network weight discretization method shown in FIG. 3 comprises:

Step S100, acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states.

Specifically, the step S100 here is the same as the step S100 in FIG. 1.

Step S200, acquiring a weight state of a previous time step and a weight increment of the current time step.

Specifically, the step S200 here is the same as the step S200 in FIG. 1.

Step S300, acquiring a state transfer direction by using a directional function according to the weight increment of the current time step.

Specifically, the step S300 here is the same as the step S300 in FIG. 1.

Step S400B, calculating a integer step length and a remainder of the weight increment of the current time step by using a decomposition function according to the weight increment of the current time step, the weight value range, and the number of discrete weight states.

Specifically, the integer step length and the remainder of $\Delta W_i^k$ are resolved:

$$\Delta W_i^k = \kappa_i \Delta z_N + v_i$$

$$\kappa_i = \text{fix}(\Delta W_i^k / \Delta z_N)$$

$$v_i = \text{rem}(\Delta W_i^k, \Delta z_N)$$

Wherein, fix(.) is a rounding function to 0; the function rem(x,y) generates a remainder of the division of two numbers and holds the same sign as x.

Step S500B, determining a state transfer distance according to the integer step length; determining a state transfer probability according to the remainder, the weight value range and the number of discrete weight states.

Specifically, the step of acquiring the state transfer distance is the same as the step S500A in the embodiment shown in FIG. 2.

A state transfer probability vector $P^k = [p_1^k, p_2^k, \ldots, p_i^k, \ldots, p_N^k]$ is calculated, wherein $p_i^k$ is a random variable within $\{0, 1\}$, with for a given $v = [v_1, v_2, \ldots, v_i, \ldots, V_N]$ a conditional probability is $$P(p_i^k = 1 | v_i) = \tau(|v_i|)$$

and $$P(p_i^k = 0 | v_i) = 1 - P(p_1^k = 1 | v_i) = 1 - \tau(|v_i|)$$

Step S600B, acquiring the weight state of the current time step according to the weight state of the previous time step, the weight increment of the current time step, the state transfer direction, the state transfer distance, the state transfer probability, the weight value range, and the number of discrete weight states.

Specifically, according to the weight state $W_i^k$ of the previous time step, the weight increment $\Delta W_i^k$ of the current time step, the weight value range [−L, L], and the number of the discrete weight states ($2^N+1$), the acquired state transfer directional function $D^k$ (i.e., the discretized weight value falls in the left side or the right side in FIG. 5) and the acquired state transfer probability $P_i^k$ (i.e., the discretized weight value falls at which of the values in FIG. 5) comprising:

Constructing a probabilistic transfer vector $(D^k \odot P^k) \cdot \Delta z_N$ according to the state transfer directional function $D^k$, the state transfer probability, and the distance value between the discrete adjacent states $\Delta z_N$, wherein $\odot$ represents a vector dot product operation.

According to the weight state of the previous time step $W_i^k$, the integer step length $\kappa$ of the weight increment at the current time step, the distance value between the discrete adjacent states $\Delta z_N$ and the probability transfer vector $(D^k \odot P^k) \cdot \Delta z_N$, the weight state of the current time step $W_i^{k+1}$ is acquired by $W^{k+1} = P(W^k + \Delta W^k) = W^k + (\kappa + D^k \odot P^k) \Delta \Delta Z_N$, and it is apparent that a discrete weight space $Z_N$ is also present in $W^{k+1}$.

In this embodiment, the remainder of the weight increment of the current time step is calculated by resolving a function for weight increment of the current time step; and the state transfer probability value is obtained according to the remainder of the weight increment of the current time step. A state transfer direction, a state transfer distance, and a state transfer probability value of the discrete weight value are determined according to the obtained state transfer direction, state transfer distance, and state transfer probability value, respectively, so that the calculated discrete weights are not only closely related to the continuous state weight values prior to discretization, but also can meet the requirements on full-time discretization by direct transfer of discrete states, thereby ensuring the computation precision of the neural network, greatly reducing the storage of virtual continuous-state implicit weight, and reducing the computation complexity.

Figure 4:
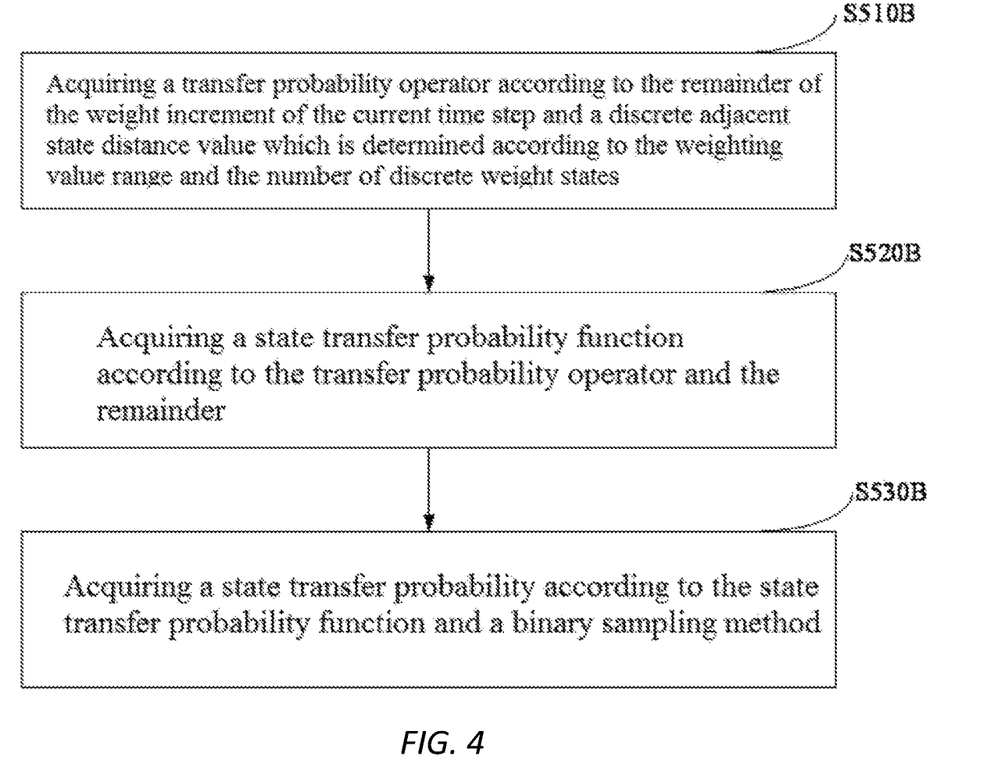
FIG. 4 is a schematic flowchart of a neural network weight discretization method in yet another embodiment.

FIG. 4 is a schematic flowchart of a neural network weight discretization method in an embodiment. The neural network weight discretization method shown in FIG. 4 comprises:

Step S510B, acquiring a transfer probability operator according to the remainder of the weight increment of the current time step and a discrete adjacent state distance value which is determined according to the weighting value range and the number of discrete weight states.

Specifically, according to the established weight value range $[-L, L]$, and the established number of the discrete weight states ($2^N+1$) which refers to the number of discretized weight values as needed, $\Delta z_N$ is used to represent the distance between adjacent states (i.e., two adjacent discretized weight values). That is, each discretized state may only be transferred to $z_N^{m+\kappa_i}$ or $Z_N^{m+\kappa_i+sign(\Delta W_i^k)}$, wherein $\kappa_i$ and $v_i$ are defined by the weight increment of the current time step $\Delta W_i^k$, and they are the integer step length portion and the remainder portion of $\Delta W_i^k$, respectively.

By presetting a transfer probability operator $\tau$, the state transfer probability $P_i^k$ is acquired according to the transfer probability operator $\tau$ and the remainder of the weight increment of the current time step v, wherein, $P_i^k \in \{0,1\}$, that is, the transfer probability operator $\tau$ is acquired according to the remainder of the weight increment of the current time step v and the distance between adjacent states $\Delta z_N$ as:

$$\tau(v) = \frac{|v|}{\Delta z_N}$$

Step S520B, acquiring a state transfer probability function according to the transfer probability operator and the remainder.

To be specific, therefore, when $0 \le \tau(v) \le 1$, acquiring the state transfer probability value as $$P_i^k \begin{array}{l} P\left(W_i^{k-1} = z_N^{m-\kappa-sign(\Delta W_i^k)} \mid W_i^k = z_N^m\right) = \tau(v) \\ P(W_i^{k-1} = z_N^{m-\kappa} \mid W_i^k = z_N^m) = 1 - \tau(v) \end{array}.$$

A nonlinear function $f(x) = \tan h(m \cdot x)$ can also be used; therefore, $$\tau(v) = f\left(\frac{|v|}{\Delta z_N}\right) = \tanh\left(m \cdot \frac{|v|}{\Delta z_N}\right)$$

where the value of $\tan h(m \cdot x)$ ranges from 0 to 1, and m is a parameter that affects the transfer probability. A general optimization model is as follows:

$$\mathrm{argmin}_W E(W)$$

$$s.t.\ W_i \in Z_N$$

wherein, $E(W)$ gives a cost function in DNN, which is determined by the application. W is a weight vector, where one element $W_i$, $i=1, 2, \ldots, N$ is a state of $Z_N$. N is the dimension of the variable W. In the forward and backward processes of DNN, all states are always constrained to the discrete space $Z_N$, and the a minimum cost function $E(W)$ is taken as a training target.

In a deep neural network, assuming that the weight/state is trained in an interval $[-L, L]$, then the DWS $Z_N$ is a combination of the following weights, defined as:

$$Z_N = \left\{ z_N^n \mid z_N^n = \left(\frac{n}{2^{N-1}} - 1\right)L, n = 0, 1, \ldots, 2^N \right\}$$

There is further defined $L_n = \{x \mid z_N^n \le x < z_N^{n+1}\}$, $n=0, 1, \ldots, 2^N-2$ and $L_{2^N-1} = \{x \mid x_N^{2^N-1} \le x < z_N^{2^N}\}$. $L_i \cap L_j = \emptyset$, $i \ne j$, $U_{n=0}^{2^N-1} L_n = [-L, L]$. For a uniformly distributed random variable $w_i$, that is to say, $w_i \in U[-L, L]$, there is a unique n making $w_i \in L_n$. When projecting a random variable $w_i \in U[-L,L]$ to $Z_N$, i.e., projecting $w_i$ to a discrete state ($z_N^n$ or $z_N^{n+1}$), the following density functions are satisfied.

$$P(w_i = z_N^n \mid w_i \in L_n) = \frac{|\Delta z_N - |z_N^n - w_i||}{\Delta z_N}, 0 \le n \le 2^N - 1 \text{ and}$$

$$P(w_i = z_N^{n+1} \mid w_i \in L_n) = 1 - P(w_i = z_N^n \mid w_i \in L_n) = \frac{|\Delta z_N - |z_N^{n+1} - w_i||}{\Delta z_N},$$

$$0 \le n \le 2^N - 1.$$

Step S530B, acquiring a state transfer probability according to the state transfer probability function and a binary sampling method.

Specifically, elements are sampled to binary values with the Monte Carlo method, denoted as $P^k = [P_1^k, P_2^k, \ldots, P_i^k, \ldots, P_N^k]$, wherein $P_i^k$ is the state transfer probability, and $P_i^k \in \{0,1\}$.

In this embodiment, a state transfer probability vector is calculated according to the state transfer probability function and the remainder of the weight increment of the current time step; by the state transfer probability vector and a binary sampling method, the obtained state transfer probability is closely related to the remainder of the weight increment of the current time step prior to discretization, so that the weight state distribution after discretization by the neural network is more accurately approximated to the original continuous state weight value in term of probability, thereby completing the process of discretization while ensuring the computation precision of the neural network.

Figure 6:
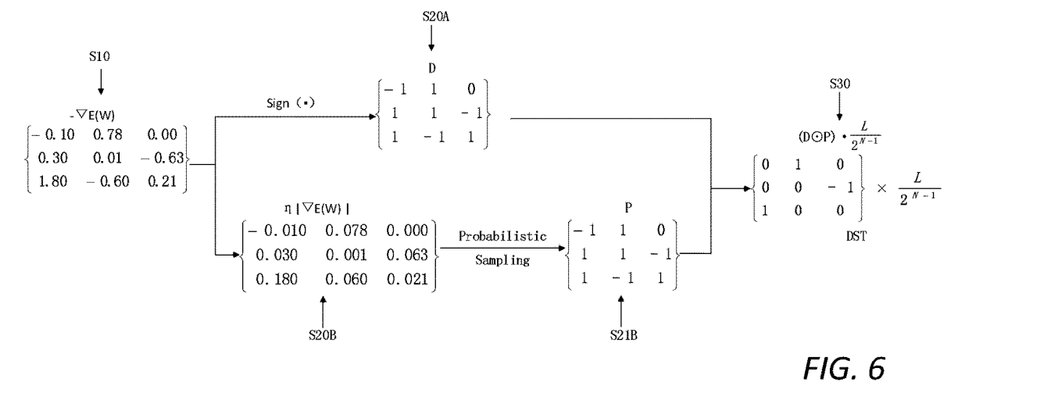
FIG. 6 is a simplified diagram for implementation of a neural network weight discretization method in an embodiment (assuming κ=0)

FIG. 6 is a simplified diagram for implementation of a neural network weight discretization method in an embodiment (assuming κ=0). In the simplified implementation of a neural network weight discretization method shown in FIG. 6:

Step S10, acquiring a weight increment of the current time step (by a gradient descent algorithm).

Specifically, for a better illustration of the simple implementation of weight discretization, a simplification is made by assuming κ=0, thereby constraining the process of discrete state transfer to adjacent states. The state transfer of discretized weight is determined by both of a state transfer direction and a transfer probability.

Step S20A, acquiring a state transfer direction.

Specifically, the state transfer direction of the discretized weight is determined by the sign of the weight increment. In particular, a positive weight increment allows a transfer in the positive direction and a negative weight increment allows a transfer in the opposite direction. A weight increment of zero enables no transfer.

Step S20B, acquiring a state transfer probability.

Specifically, the state transfer probability of the discretized weight is directly proportional to the absolute value of the weight increment, and the state transfer probability for sampling is acquired by calculations on a selected step length and the absolute value.

Step S21B, sampling a state transfer probability.

Specifically, this embodiment employs a binary sampling algorithm, where the sampled results are 0 or 1. A sampled result with a value of 1 represents a state transfer event, and a value 0 means no state transfer event occurs.

Step S30, acquiring a result of weight discretization.

Specifically, the final state transfer result of the weight discretization is obtained by the vector dot product operations on the state transfer direction, a binarization sampling result of the transfer probability, and a distance $\Delta z_N$ between adjacent states in DWS.

In recent years, deep neural networks consume intolerable hardware resources, training time and energy. The disclosure proposes a unified discrete space transfer device, which constrains weights to one discrete weight space throughout the training process, with flexible and configurable number of states, by introducing a discrete state transfer method. The transfer between discrete states reduces the storage space and other computational overhead for weights with full precision. The given DST framework is hardware friendly because it can be easily configured for a variety of memory devices, such as binary, triple or multi-value memory devices. This work paved the way for on-chip learning in a variety of portable devices.

The disclosure proposes a unified discrete state transfer (DST) device. In this device, the continuous weight update in the full-precision space is transformed into a discrete state direct transfer, thereby greatly reducing the storage overhead of weight information and computation complexity, so that the neural network can operate at low cost on mobile devices. The device provided by the disclosure can obtain better effects on data sets such as MNIST, CIFAR10 and SVHN. In addition, since the number of discrete states is configurable, it can be used for multi-valued memory devices (such as RRAM/PCRAM or memristors) to take full advantage of the multi-value storage characteristics of such devices. Since the weights are always in a discrete state when being used for training and reasoning of a neural network, the use of a full-precision weight external memory can be significantly reduced or eliminated.

Figure 7:
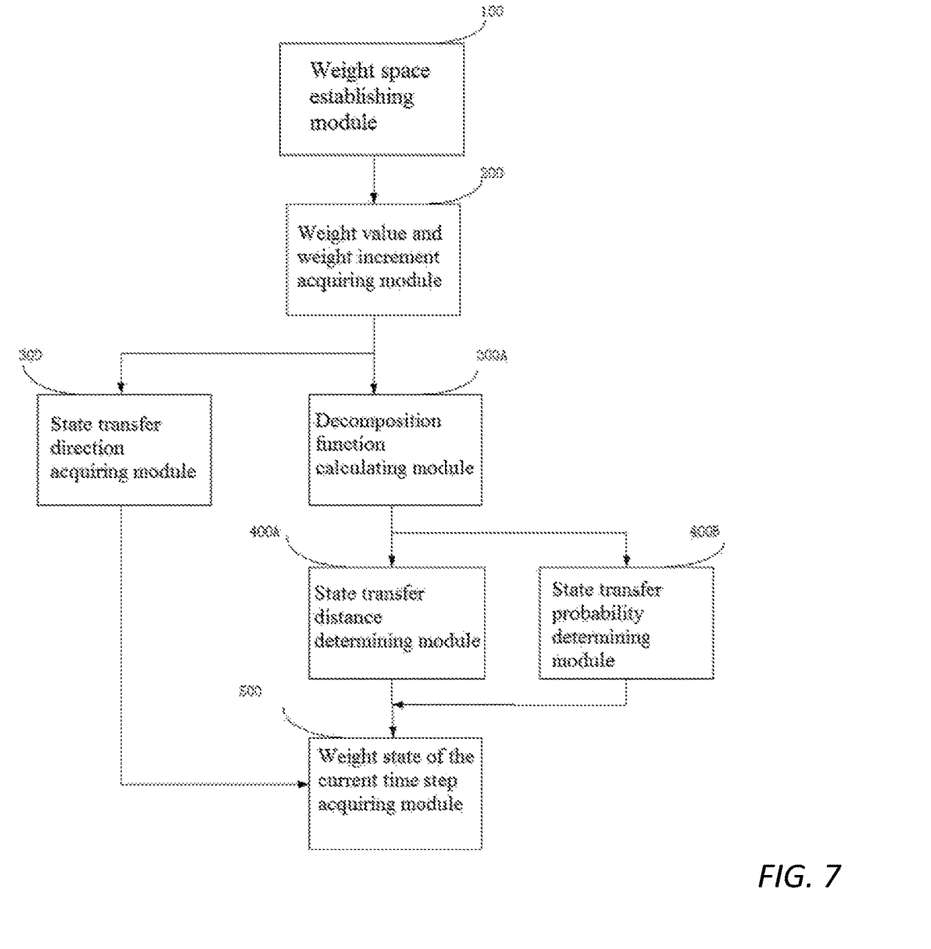
FIG. 7 is a structural diagram of a neural network weight discretization system in an embodiment.

FIG. 7 is a structural diagram of a neural network weight discretization system in an embodiment. The neural network weight discretization system shown in FIG. 7 comprises:

A weight space establishing module 100 for acquiring a weight value range and a number of discrete weight states, the weight value range referring to a range of discrete weight values consisting of a maximum weight value of a current time step and a minimum weight value of the current time step, and the number of discrete weight states referring to the quantity of discrete weight states.

A weight value and weight increment acquiring module 200 for acquiring a weight state of a previous time step and a weight increment of the current time step; the weight value and weight increment acquiring module 200 comprises a weight matrix initializing unit for randomly initializing the weight state; a weight state of previous time step determining unit for determining the weight state of the previous time step from calculations according to the randomly initialized weight state and a forward output error; and A weight increment of current time step acquiring unit for acquiring a weight increment of the current time step by using a gradient descent algorithm according to the weight state of the previous time step.

A state transfer direction acquiring module 300 for acquiring a state transfer direction by using a directional function according to the weight increment of the current time step.

A decomposition function calculating module 300A for calculating a integer step length of the weight increment of the current time step by using a decomposition function according to the weight increment of the current time step, the weight value range, and the number of discrete weight states; the decomposition function calculating module 300A is further used for calculating a remainder of the weight increment of the current time step by using a decomposition function according to the weight increment of the current time step, the weight value range and the number of discrete weight states.

A state transfer distance determining module 400A for determining a state transfer distance according to the integer step length.

A state transfer probability determining module 400B for determining the state transfer probability according to the remainder, the weight value range and the number of discrete weight states; the state transfer probability determining module 400B comprises: a transfer probability operator acquiring unit for acquiring a transfer probability operator according to the remainder of the weight increment of the current time step and a discrete adjacent state distance value which is determined according to the weighting value range and the number of discrete weight states; a state transfer probability function acquiring unit for acquiring a state transfer probability function according to the transfer probability operator and the remainder; and a state transfer probability acquiring unit for acquiring a state transfer probability according to the state transfer probability function and a binary sampling method.

A weight state of the current time step acquiring module 500 for acquiring a weight state of the current time step according to the weight state of the previous time step, the weight increment of the current time step, the state transfer direction, the weight value range and the number of discrete weight states. The weight state of the current time step acquiring module 500 is also used for acquiring the weight state of the current time step, according to the weight state of the previous time step, the weight increment of the current time step, the state transfer direction, the state transfer distance, the weight value range, and the number of discrete weight states, and is further used for acquiring the weight state of the current time step, according to the weight state of the previous time step, the weight increment of the current time step, the state transfer direction, the state transfer distance, the state transfer probability, the weight value range, and the number of discrete weight states.

According to the neural network weight discretizing system provided by the present disclosure, with a given discrete weight space, on the basis of the acquired weight state of the previous time step and the weight increment of the current time step, the range weight values of the current time step in a virtual continuous state space is calculated, a state transfer direction is acquired, and finally the weight state of the current time step is acquired according to the weight state of the previous time step, the weight increment of the current time step and the state transfer direction. The calculating method for the weight discretization provided by the disclosure can realizing a direct transfer of the state in a discrete state space within a given weight discrete range according to the given number of discrete weight states by calculating the transfer direction of the discrete weights, making sure that the weight value is always constrained in the same discrete-state space without the need for storing an additional virtual continuous-state implicit weight with full precision. On the premise that the computation performance of the neural network is ensured, the consumption of a storage space is greatly reduced, and the computation complexity is reduced. By randomly initializing the weight state, after a range for weight discretization is given, the weight state of the previous time step and the weight increment of the current time step are obtained with a given forward output error and a gradient descent algorithm, to ensure the precision of the weight state after discretization. after acquiring the state transfer direction, the integer step length of the weight increment of the current time step is further calculated by the decomposition function, and the state transfer distance is determined according to the integer step length; finally the weight state of the current time step is acquired according to the weight state of the previous time step, the weight increment of the current time step, the state transfer direction, the state transfer distance, the weight value range, and the number of the discrete weight states. In given weight discrete range, a direct transfer of the state of the discrete-state space, with a larger range than the case where only the transfer direction is taken into consideration, can be achieved by calculating the transfer direction and transfer distance of the discrete weights according to the given number of discrete weight states within a given weight discrete range, making sure that the weight value is always constrained in the same discrete-state space, without the need for storing an additional virtual continuous-state implicit weight with full precision. On the premise that the computation performance of the neural network is ensured, the consumption of a storage space is greatly reduced, and the computation complexity is reduced. The remainder of the weight increment of the current time step is calculated by resolving a function for weight increment of the current time step; and the state transfer probability value is obtained according to the remainder of the weight increment of the current time step. A state transfer direction, a state transfer distance, and a state transfer probability value of the discrete weight value are determined according to the obtained state transfer direction, state transfer distance, and state transfer probability value, respectively, so that the calculated discrete weights are not only closely related to the continuous state weight values prior to discretization, but also can meet the requirements on full-time discretization by direct transfer of discrete states, thereby ensuring the computation precision of the neural network, greatly reducing the storage of virtual continuous-state implicit weight, and reducing the computation complexity. A state transfer probability vector is calculated according to the state transfer probability function and the remainder of the weight increment of the current time step; by the state transfer probability vector and a binary sampling method, the obtained state transfer probability is closely related to the remainder of the weight increment of the current time step prior to discretization, so that the weight state distribution after discretization by the neural network is more precisely approximated to the original continuous state weight value in term of probability, thereby completing the process of discretization while ensuring the computation precision of the neural network.

Figure 8:
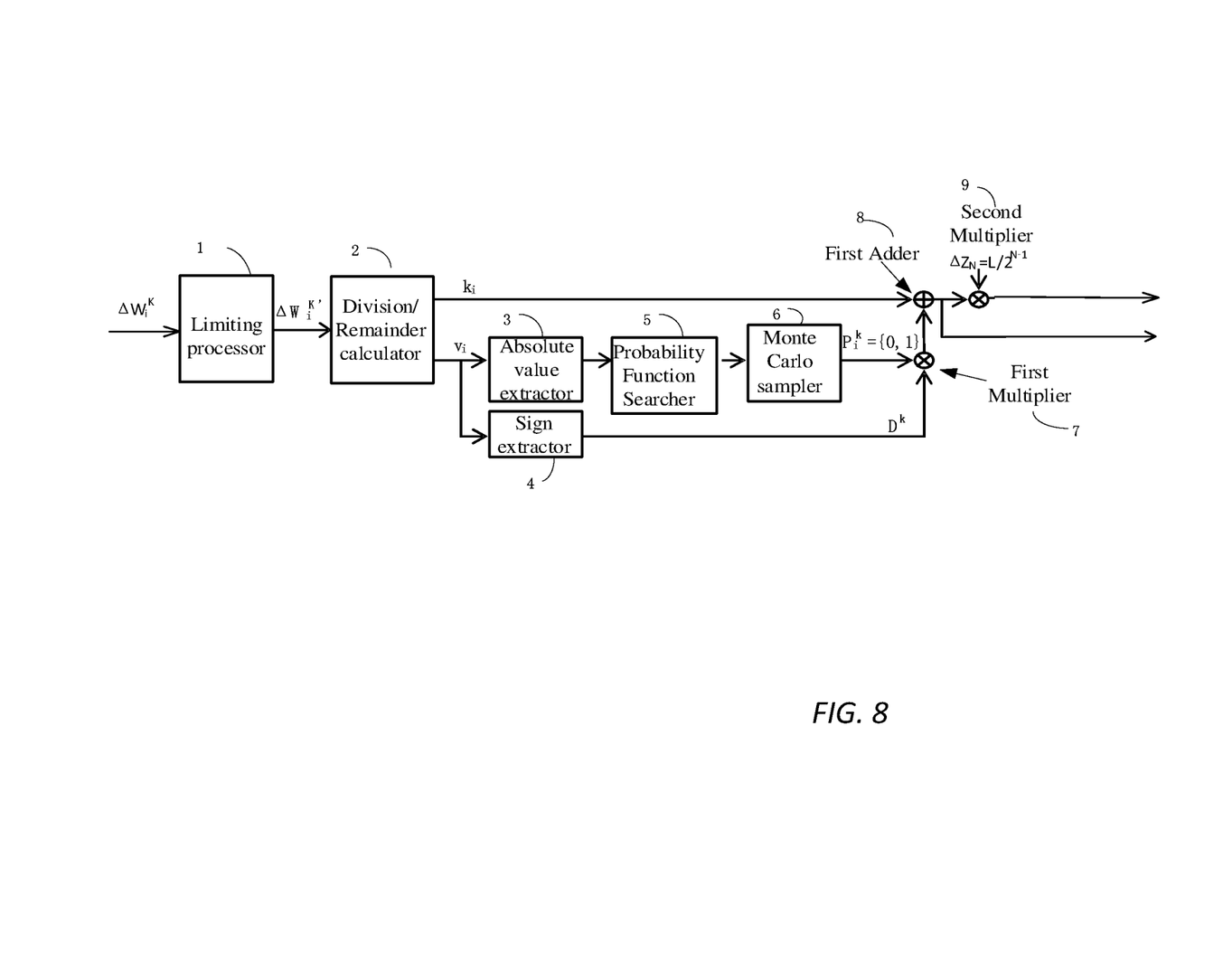
FIG. 8 is a diagram showing the hardware of a neural network weight discretization system in an embodiment.

FIG. 8 is a diagram showing the hardware of a neural network weight discretization system in an embodiment. The neural network weight discretization system as shown in FIG. 8 comprises: a limiting processor 1, a division/remainder calculator 2, an absolute value extractor 3, a sign extractor 4, a probability function searcher 5, and a Monte Carlo sampler 6, a first multiplier 7, a first adder 8, and a second multiplier 9. The system is capable of performing discretization conversion on the input full-precision weight variables with full precision. The various hardware processors in the figure are all implemented by processing hardware with corresponding functions.

The hardware connection shown in FIG. 8 is as follows: the output of the limiting processor 1 is connected to the input of the division/remainder calculator 2; the divisor output of the division/remainder calculator 2 is connected to the first adder 8, and the remainder output of the division/remainder calculator 2 is connected to the input of the absolute value extractor 3 and the sign extractor 4; the output of the absolute value extractor 3 is connected to the input of the probability function searcher 5; the output of the probability function searcher 5 is connected to the input of the Monte Carlo sampler 6; the output of the Monte Carlo sampler 6 is connected to the input of the first multiplier 7; the output of the sign extractor 4 is also connected to the input of the first multiplier 7; the output of the first multiplier 7 is connected to the input of the first adder 8; the output of the first adder 8 is connected to the input of the second multiplier 9.

Those skilled in the art will appreciate that embodiments of the present application may be provided as a method, a system, or a computer program product. Thus, the present application may take the form of an full hardware embodiment, a full software embodiment or an embodiment in combination of software and hardware. Moreover, the application may take the form of a computer program product implemented on one or more computer-usable storage media (including but not limited to disk storage, CD-ROM, optical storage and the likes) containing computer usable program code thereon.

The present application is described with reference to flowcharts and/or block diagrams of methods, apparatus (systems), and computer program products according to the embodiments herein. It will be understood that each flow and/or block of the flowcharts and/or block diagrams, and combinations of flows and/or blocks in the flowcharts and/or block diagrams can be implemented by computer program instructions. These computer program instructions can be provided to a general computer, a special-purpose computer, an embedded processor or processors of other programmable data processing devices to produce a machine, such that the instructions executed by a processor of a computer or other programmable data processing device generates a device that implements the functions specified in one or more flows in the flowchart and/or one or more blocks in the block diagram.

The computer program instructions can also be stored in a computer readable memory that can direct a computer or other programmable data processing devices to operate in a particular manner, such that the instructions stored in the computer readable memory produce a product comprising the instruction device. The instruction device implements the functions specified in one or more flows in the flowchart and/or one or more blocks in the block diagram.

These computer program instructions can also be loaded onto a computer or other programmable data processing devices such that a series of operational steps are performed on the computer or other programmable devices to produce computer-implemented processing, so that the instructions executed on the computer or other programmable devices provide steps for implementing the functions specified in one or more flows in the flowchart and/or one or more blocks in the block diagram.

The technical features of the above-described embodiments may be arbitrarily combined. For the sake of brevity of description, not all possible combinations of the technical features in the above embodiments are described. However, all should be considered as falling within the scope of the present disclosure as long as there is no contradiction among the combinations of these technical features The above-mentioned embodiments are merely illustrative of several embodiments of the present disclosure, with more specific and detailed descriptions; but these are not to be construed as limiting the scope of the disclosure. It should be noted that a number of variations and modifications may be made by those skilled in the art without departing from the spirit and scope of the disclosure. Therefore, the scope of the present disclosure should be determined by the appended claims.

What is claimed is:

1. A neural network weight discretizing method for training a neural network comprising:
   acquiring a weight value range and a number of discrete weight states, the weight value range referring to a range of discrete weight values consisting of a maximum weight value of a current time step and a minimum weight value of the current time step, and the number of discrete weight states referring to a quantity of discrete weight states;
   acquiring a weight state of a previous time step and a weight increment of the current time step;
   acquiring a state transfer direction by using a directional function according to the weight increment of the current time step;
   acquiring a weight state of the current time step according to the weight state of the previous time step, the weight increment of the current time step, the state transfer direction, the weight value range and the number of discrete weight states; and
   training the neural network according to the weight state of the previous time step, the weight increment of the current time step, the state transfer direction, the weight value range, the number of discrete weight states, and the weight state of the current time step.

2. The neural network weight discretizing method according to claim 1, said acquiring a weight state of a previous time step and a weight increment of the current time step comprises:
   randomly initializing the weight state;
   determining the weight state of the previous time step from calculations according to the randomly initialized weight state and a forward output error; and
   acquiring the weight increment of the current time step by using a gradient descent algorithm according to the weight state of the previous time step.

3. The neural network weight discretizing method according to claim 1, further comprises, after acquiring a state transfer direction by using a directional function according to the weight increment of the current time step:
   calculating a integer step length of the weight increment of the current time step by using a decomposition function according to the weight increment of the current time step, the weight value range, and the number of discrete weight states; and
   determining a state transfer distance according to the integer step length;
   wherein said acquiring a weight state of the current time step according to the weight state of the previous time step, the weight increment of the current time step, the state transfer direction, the weight value range and the number of discrete weight states further comprises:
   acquiring the weight state of the current time step according to the weight state of the previous time step, the weight increment of the current time step, the state transfer direction, the state transfer distance, the weight value range, and the number of discrete weight states.

4. The neural network weight discretizing method according to claim 3, further comprises, after calculating a integer step length of the weight increment of the current time step by using a decomposition function:
   calculating a remainder of the weight increment of the current time step by using a decomposition function according to the weight increment of the current time step, the weight value range and the number of discrete weight states; and
   determining a state transfer probability according to the remainder, the weight value range and the number of discrete weight states;
   wherein said acquiring the weight state of the current time step according to the weight state of the previous time step, the weight increment of the current time step, the state transfer direction, the state transfer distance, the weight value range, and the number of discrete weight state further comprises:
   acquiring the weight state of the current time step according to the weight state of the previous time step, the weight increment of the current time step, the state transfer direction, the state transfer distance, the state transfer probability, the weight value range, and the number of discrete weight states.

5. The neural network weight discretizing method according to claim 4, wherein said determining a state transfer probability according to the remainder, the weight value range and the number of discrete weight states comprises:
   acquiring a transfer probability operator according to the remainder of the weight increment of the current time step and a discrete adjacent state distance value which is determined according to the weighting value range and the number of discrete weight states;

acquiring a state transfer probability function according to the transfer probability operator and the remainder;

acquiring a state transfer probability according to the state transfer probability function and a binary sampling method.

6. A computing system, including a processor and a memory storing computer instructions thereon, wherein the computer instructions, when being executed by the processor, cause the processor to perform steps of the method according to claim 1.

7. A non-transitory computer readable storage medium containing computer instructions, wherein the computer instructions, when being executed by a processor, cause the processor to perform steps of the method according to claim 1.

* * * * *